US009772066B2

(12) United States Patent
Tseng

(10) Patent No.: US 9,772,066 B2
(45) Date of Patent: Sep. 26, 2017

(54) SUPPORTING DEVICE FOR PORTABLE ELECTRONIC DEVICE

(71) Applicant: FIH (HONG KONG) LIMITED, Kowloon (HK)

(72) Inventor: Chien-Feng Tseng, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 159 days.

(21) Appl. No.: 14/713,835

(22) Filed: May 15, 2015

(65) Prior Publication Data

US 2016/0164323 A1    Jun. 9, 2016

(30) Foreign Application Priority Data

Dec. 4, 2014    (TW) .............................. 103142128 A

(51) Int. Cl.
*H02J 7/00* (2006.01)
*F16M 13/02* (2006.01)
*F16M 11/06* (2006.01)
*F16B 47/00* (2006.01)
*F16B 1/00* (2006.01)
*F16B 2/06* (2006.01)

(52) U.S. Cl.
CPC ........... *F16M 13/022* (2013.01); *F16B 47/00* (2013.01); *F16M 11/06* (2013.01); *F16B 2/065* (2013.01); *F16B 2001/0064* (2013.01); *H02J 7/0042* (2013.01)

(58) Field of Classification Search
CPC ... H02J 7/0042; F16M 11/06; F16M 2200/08; F16B 2/00; F16B 2/10; F16B 2/16; F16B 2/065; F16B 47/00; F16B 13/022
USPC ......................................................... 320/115
See application file for complete search history.

(56) References Cited

U.S. PATENT DOCUMENTS

| 2012/0275141 A1* | 11/2012 | Keith | ........................ F21L 4/00 362/158 |
| 2014/0340839 A1* | 11/2014 | Liniger | ................. G06F 1/1632 361/679.43 |
| 2016/0036478 A1* | 2/2016 | Wong | .................... H02J 7/0044 455/573 |
| 2016/0091926 A1* | 3/2016 | Saxton | .................. G06F 1/1626 710/304 |

* cited by examiner

Primary Examiner — Paul Dinh
(74) Attorney, Agent, or Firm — Steven Reiss

(57) ABSTRACT

A supporting device includes a base, a fixing structure, a rotating structure, and a supporting structure. The fixing structure is mounted to the base. The rotating structure is rotatably mounted to the fixing structure. The supporting structure is configured to support a portable electronic device. The supporting structure is mounted to the rotating structure and rotates along with the rotating structure relative to the fixing structure.

19 Claims, 5 Drawing Sheets

“SUPPORTING DEVICE FOR PORTABLE ELECTRONIC DEVICE”

CROSS-REFERENCE TO RELATED APPLICATIONS

This application claims priority to Taiwanese Patent Application No. 103142128 filed on Dec. 4, 2014, the contents of which are incorporated by reference herein.

FIELD

The subject matter herein generally relates to a supporting device for holding a portable electronic device.

BACKGROUND

There are many supporting devices available for supporting portable electronic devices. Commonly, the supporting device can only support the portable electronic device in a horizontal direction, which is inconvenient for a user to operate the supporting device and the portable electronic device.

BRIEF DESCRIPTION OF THE DRAWINGS

Implementations of the present technology will now be described, by way of example only, with reference to the attached figures.

DETAILED DESCRIPTION

Figure 1:
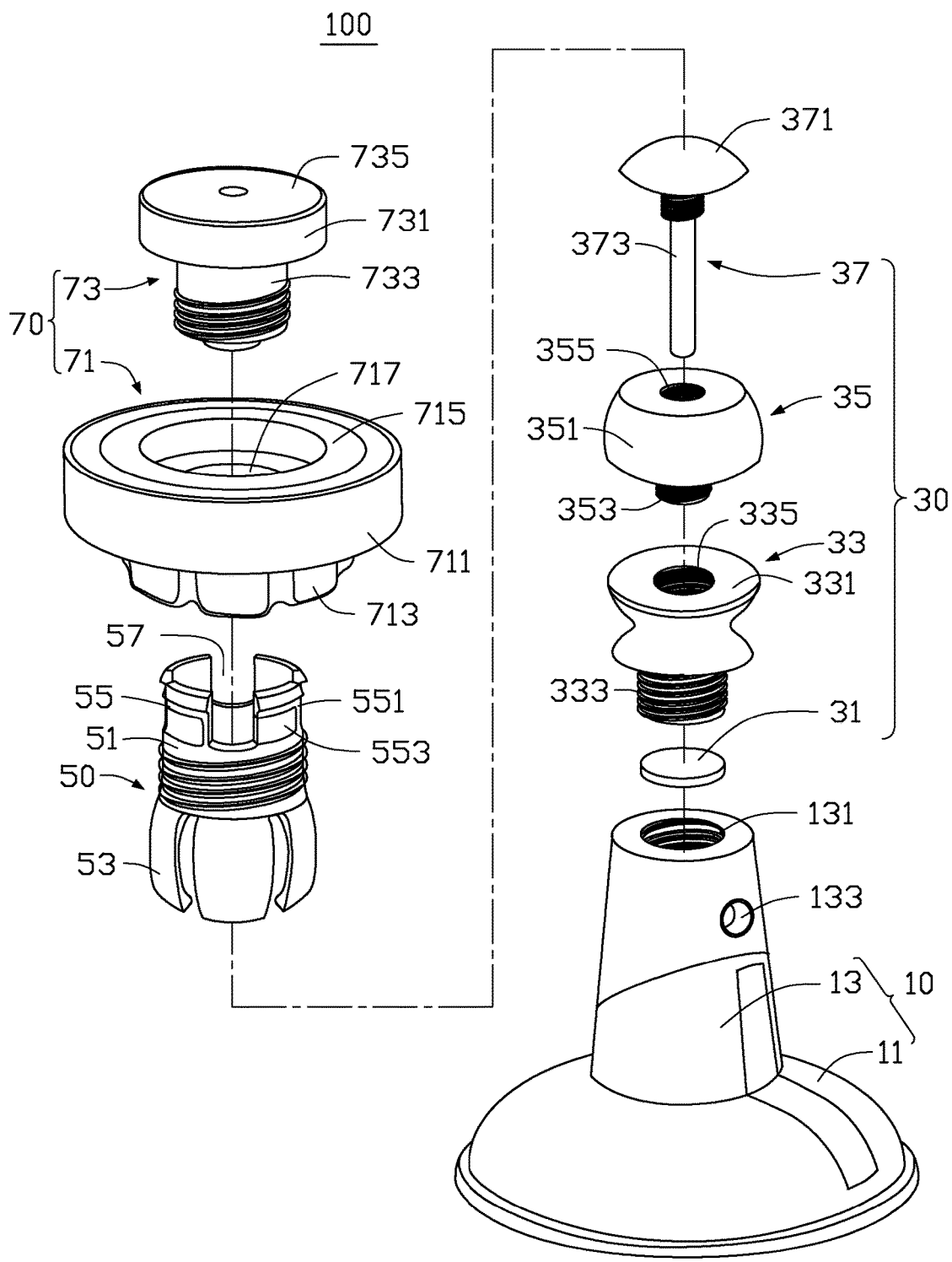
FIG. 1 is an exploded, isometric view of an embodiment of a supporting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a supporting device 100 for holding a portable electronic device 200 (shown in FIGS. 3 and 4), for example, a mobile phone, a tablet computer, an electronic book, or the like. The supporting device 100 is further configured to charge the portable electronic device 200. The supporting device 100 includes a base 10, a fixing structure 30, a rotating structure 50, and a supporting structure 70.

The base 10 includes a main body 11 and a receiving portion 13. In this embodiment, the main body 11 is substantially a sucker and is made of soft material, such as rubber, plastic, or the like. The main body 11 is attached to an article, such as a desk, and is configured to fix the supporting device 100 to the article. The receiving portion 13 is substantially a hollow cylinder. The receiving portion 13 is positioned at a middle portion of a top surface of the main body 11. One surface of the receiving portion 13 away from the main body 11 defines a first mounting hole 131. A peripheral wall of the receiving portion 13 further defines a through hole 133. The through hole 133 is in communication with the first mounting hole 131.

The fixing structure 30 is mounted to the first mounting hole 131 of the base 10. The fixing structure 30 includes a power plate 31, a first conducting member 33, an insulating member 35, and a second conducting member 37. The power plate 31 is secured in the first mounting hole 131 and can be electrically connected to a power supply 300 (shown in FIG. 3) through a connecting line passing through the through hole 133.

The first conducting member 33 is assembled to the receiving portion 13 and can be made of a conducting material. The first conducting member 33 includes a main portion 331 and a first conducting portion 333. The first conducting portion 333 is substantially a cylinder and is positioned at one end of the main portion 331. The first conducting portion 333 is secured in the first mounting hole 131 through a screw-thread connection or the like. In this embodiment, the first conducting portion 333 is assembled in the first mounting hole 131 through a screw-thread connection. In detail, an interior of the first mounting hole 131 includes at least one internal thread. An exterior of the first conducting portion 333 includes at least one external thread. Then, the external thread of the first conducting portion 333 is threadedly engaged with the internal thread of the first mounting hole 131. One surface of the main portion 331 opposite to the first conducting portion 333 defines a second mounting hole 335. The second mounting hole 335 passes through the main portion 331 and the first conducting portion 333.

In this embodiment, the insulating member 35 is made of an insulating material. The insulating member 35 is positioned between the first conducting member 33 and the second conducting member 37, and is configured to isolate the first conducting member 33 and the second conducting member 37. The insulating member 35 includes a first insulating portion 351 and a second insulating portion 353. The second insulating portion 353 is substantially a cylinder and is projected from one end of the first insulating portion 351. The second insulating portion 353 is mounted in the second mounting hole 335 through a screw-thread connection or the like, thereby the insulating member 35 is assembled to the first conducting member 33. One side of the first insulating portion 351 away from the second insulating portion 353 defines a third mounting hole 355. The third mounting hole 355 passes through the first insulating portion 351 and the second insulating portion 353.

The second conducting member 37 includes a head portion 371 and a second conducting portion 373. In this embodiment, an outside surface of the head portion 371 is substantially arched. The second conducting portion 373 is positioned at one side of the head portion 371 facing towards the insulating member 35. A diameter of the second conducting portion 373 is less than a diameter of the third mounting hole 355. The second conducting portion 373 is mounted in the third mounting hole 355 through a screw-thread connection or the like, thereby assembling the second conducting member 37 to the insulating member 35.

The rotating structure 50 is sleeved on the fixing structure 30 to allow the rotating structure 50 to resist the first conducting member 33 and rotate relative to the fixing structure 30. The rotating structure 50 includes a fixing portion 51, a rotating portion 53, and a mounting portion 55. The rotating portion 53 is mounted to one side of the fixing portion 51 and has a shape and a size corresponding to the fixing structure 30. The rotating portion 53 is rotatably mounted to the fixing structure 30. The mounting portion 55 is mounted at one side of the fixing portion 51 away from the rotating portion 53. A peripheral wall of the mounting portion 55 defines a plurality of receiving slot 551. Each receiving slot 551 includes a conducting plate 553. In this embodiment, the rotating portion 53 is made of a conducting material and the conducting plate 553 is electrically connected to the rotating portion 53 through shrapnel or the like. A receiving hole 57 is defined at the rotating structure 50 and passed through the mounting portion 55, the fixing portion 51, and the rotating portion 53.

The supporting structure 70 includes a first supporting member 71 and a second supporting member 73. The first supporting member 71 is mounted to the fixing portion 51. The second supporting member 73 is received in the first supporting member 71. The first supporting member 71 and the second supporting member 73 cooperatively support the portable electronic device 200.

The first supporting member 71 includes a holding portion 711, an assembling portion 713, and a first absorbing portion 715. The assembling portion 713 is positioned at one surface of the holding portion 711 towards the rotating structure 50. A size of the assembling portion 713 corresponds to the fixing portion 51. The assembling portion 713 is configured to match with the fixing portion 51 and make the supporting structure 70 to be mounted on the rotating structure 50 and rotate along with the rotating structure 50. In this embodiment, the assembling portion 713 is coupled to the fixing portion 51 through a screw-thread connection or the like. The first absorbing portion 715 is substantially loop and is positioned on one surface of the holding portion 711 away from the assembling portion 713. When the first supporting member 71 is mounted to the mounting portion 55, the first absorbing portion 715 is electrically connected to the conducting plate 553 of the mounting portion 55 through a metallic sheet or the like (not shown). In this embodiment, the first absorbing portion 715 is a magnetic member, such as a magnet. The first absorbing portion 715 is further configured to conduct negative current. A guiding hole 717 is defined at a middle portion of the holding portion 711.

The second supporting member 73 includes a supporting portion 731, a protruding portion 733, and a second absorbing portion 735. The supporting porting 731 is substantially a cylinder. The protruding portion 733 is positioned at one side of the supporting portion 731. The protruding portion 733 is received in the guiding hole 717 to allow the second supporting member 73 to be mounted in the guiding hole 717. The second absorbing portion 735 is substantially circular and is positioned on one surface of the supporting portion 731 away from the protruding portion 733. When the second supporting member 73 is assembled to the first supporting member 71, the second absorbing portion 735 is coplanar with the first absorbing portion 715. In this embodiment, the second absorbing portion 735 is a magnetic member, such as a magnet. The second absorbing portion 735 is further configured to conduct positive current.

Figure 2:
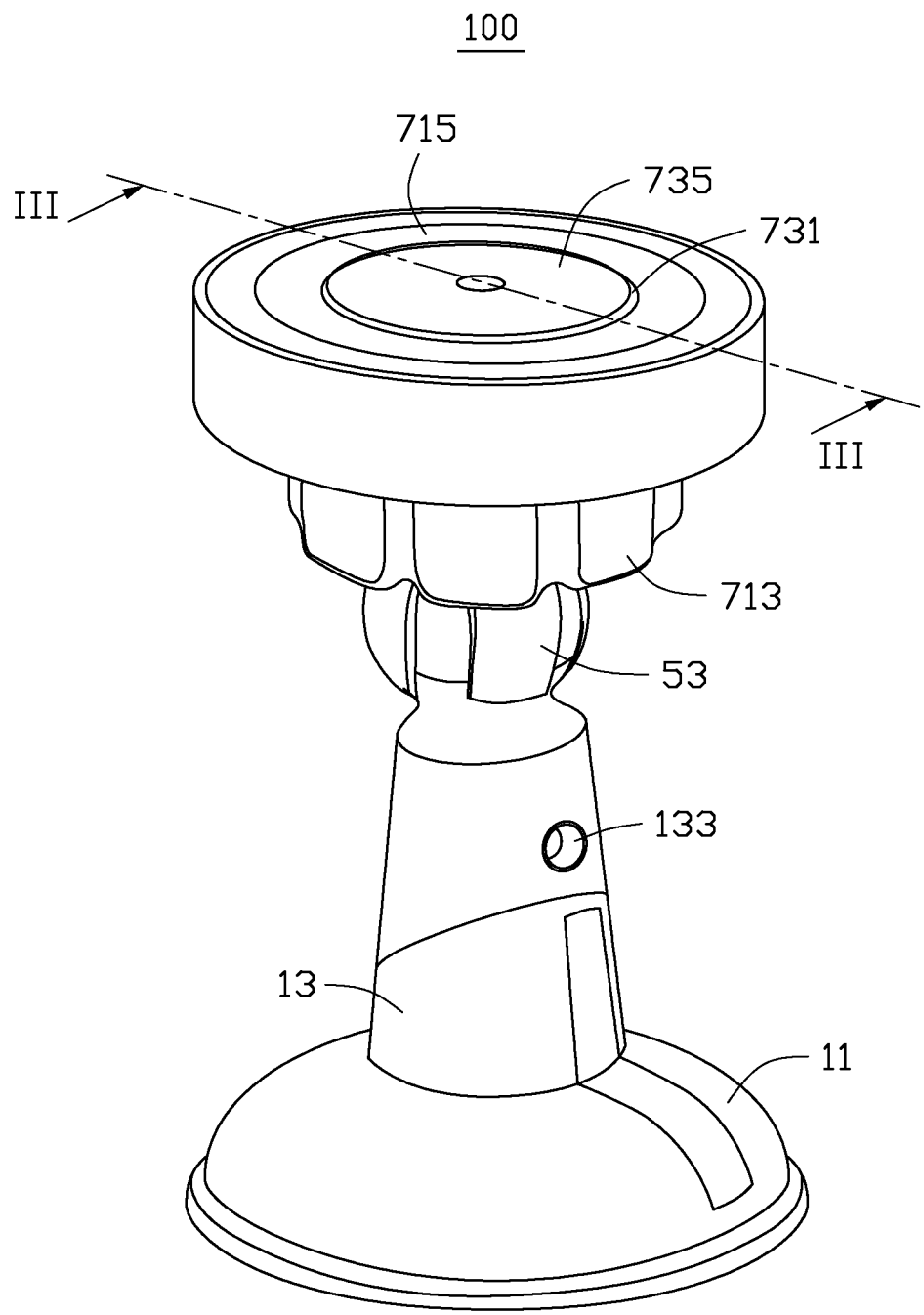
FIG. 2 is an assembled, isometric view of the supporting device of FIG. 1.

Referring to FIG. 2, in assembly of the supporting device 100, the power plate 31 is mounted in the first mounting hole 131. The first conducting portion 333 of the first conducting member 33 is aligned with the first mounting hole 131. The first conducting portion 333 is pressed to be received in the first mounting hole 131. The second insulating portion 353 of the insulating member 35 is aligned with the second mounting hole 335. The insulating member 35 is pressed to make the second insulating portion 353 to be received in the first conducting member 33. The second conducting portion 373 of the second conducting member 37 is aligned with the third mounting hole 355. The head portion 371 of the second conducting member 37 is pressed and the second conducting portion 373 passes through the third mounting hole 355 and the second mounting hole 335, thereby the second conducting member 37 is assembled to the insulating member 35.

The rotating portion 53 of the rotating structure 50 is aligned with the head portion 371 of the second conducting member 37. The rotating structure 50 is mounted on the fixing structure 30 with the rotating portion 53 latching with the main portion 331 of the first conducting member 33. Then, the rotating portion 53 is electrically connected to the main portion 331 and can rotate relative to the main portion 331. The assembling portion 713 of the first supporting member 71 is aligned with the mounting portion 55. The first supporting member 71 is mounted to the rotating structure 50 and the first absorbing portion 715 is electrically connected to the conducting sheet 553. The protruding portion 733 of the second supporting member 73 is aligned with the guiding hole 717 and the receiving hole 57. The protruding portion 733 passes through the guiding hole 717 and is received in the receiving hole 57. In this way, the first absorbing portion 715 is coplanar with the second absorbing portion 735.

Figure 3:
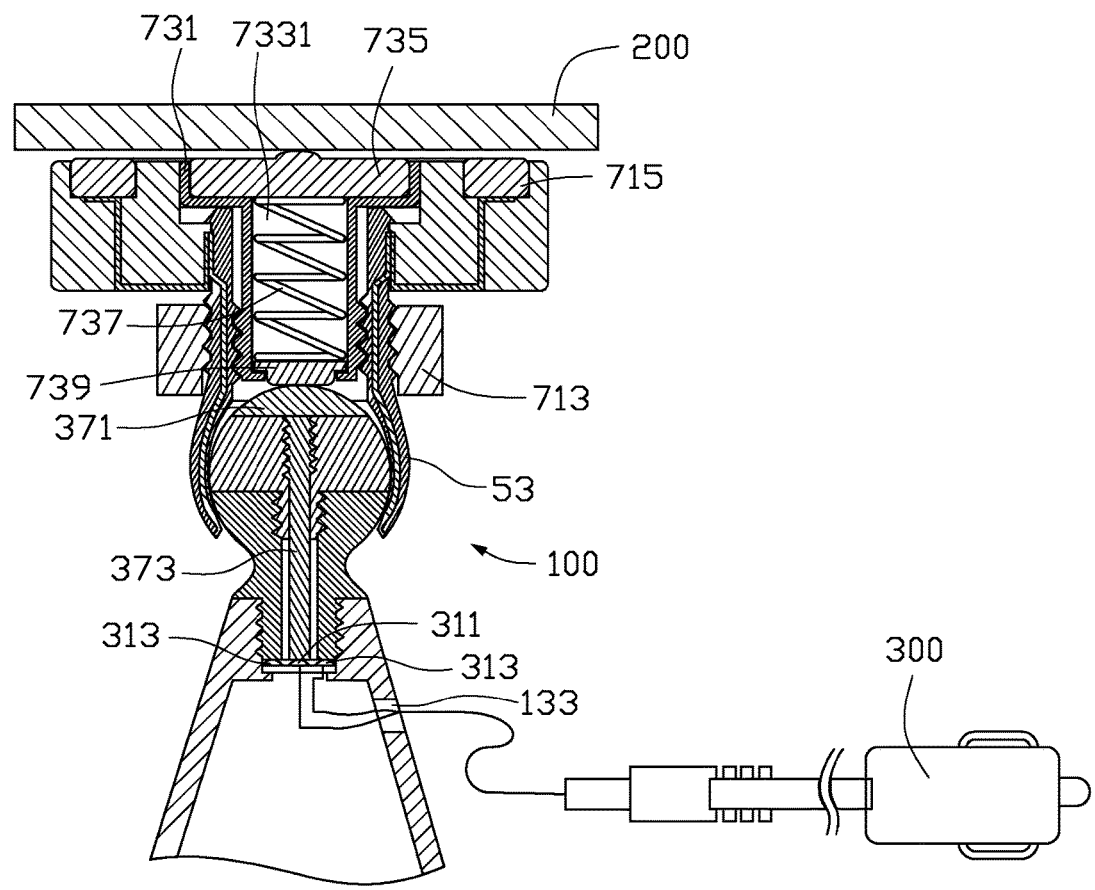
FIG. 3 is a cross-sectional view taken along line III-III of FIG. 2.

Referring to FIG. 3, the power plate 31 includes a first conducting point 311 and at least one second conducting point 373. The first conducting point 311 is spaced apart from the second conducting point 373. In this embodiment, there are one first conducting point 311 and two second conducting points 313. The two conducting points 313 are positioned surround the first conducting point 311. The first conducting point 311 is a positive conducting point. The second conducting points 313 are negative conducting points. In other embodiments, the two second conducting points 313 can be replaced by a conducting ring.

As illustrated, a positioning hole 7331 is defined at an axis direction of the protruding portion 733. The second supporting member 73 further includes an elastic portion 737 and a second conducting sheet 739. The elastic portion 737 is received in the positioning hole 7331 with one end of the elastic portion 737 fixed to the second absorbing portion 735 and the other end of the elastic portion 737 electrically connected to the conducting sheet 739.

When the first conducting portion 333 is received in the first mounting hole 131 of the receiving portion 13, a peripheral edge of the first conducting portion 333 resists and electrically connected to the second conducting point 313. Due to the first absorbing portion 715 is electrically connected to the conducting sheet 553 and the rotating portion 53 is electrically connected to the main portion 331, thus the first absorbing portion 715, the conducting sheet 553, the rotating portion 53, the main portion 331, and the first conducting portion 333 are connected in order, thereby forming a first charging path.

When the second conducting portion 373 passes through the third mounting hole 355 and the second mounting hole 335, the second conducting portion 373 contacts with and is electrically connected to the first conducting point 311 on the power plate 31. Due to the second absorbing portion 735 is electrically connected to the conducting sheet 739 through the elastic member 737 and the conducting sheet 739 resists the head portion 371 of the second conducting member 37, thus the second absorbing portion 735, the elastic member 737, the conducting sheet 739, the head portion 371, the second conducting portion 373, and the first conducting point 311 are electrically connected in order, thereby forming a second charging path. In this embodiment, the first charging path is a negative charging path and the second charging path is a positive charging path.

Figure 4:
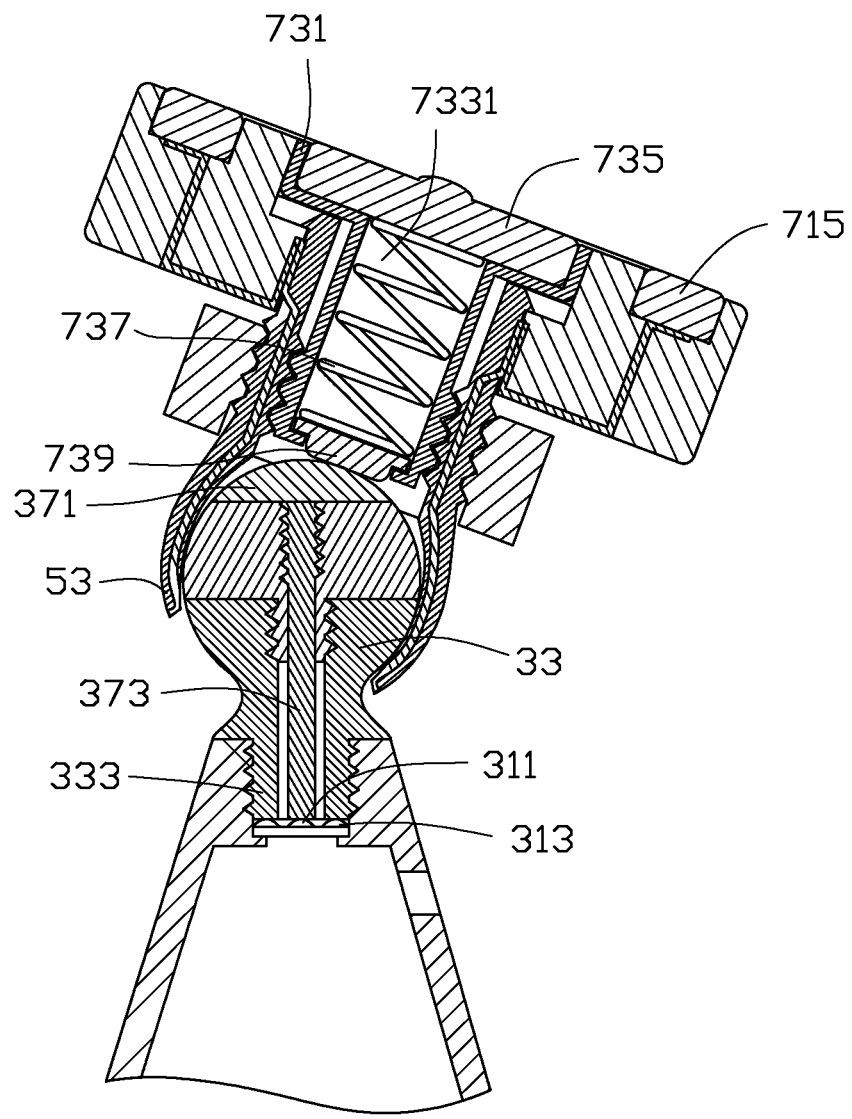
FIG. 4 is a cross-sectional view of FIG. 2, when the supporting device rotates to a predetermined angle.

Referring to FIG. 4, when the supporting device 100 is used, the portable electronic device 200 is placed on a supporting surface formed by the first absorbing portion 715 and the second absorbing portion 735. Then, the portable electronic device 200 can be steadily supported by the first absorbing portion 715 and the second absorbing portion 735. When the rotating portion 53 rotates relative to the fixing structure 30, the portable electronic device 200 rotates along with the rotating portion 53.

Figure 5:
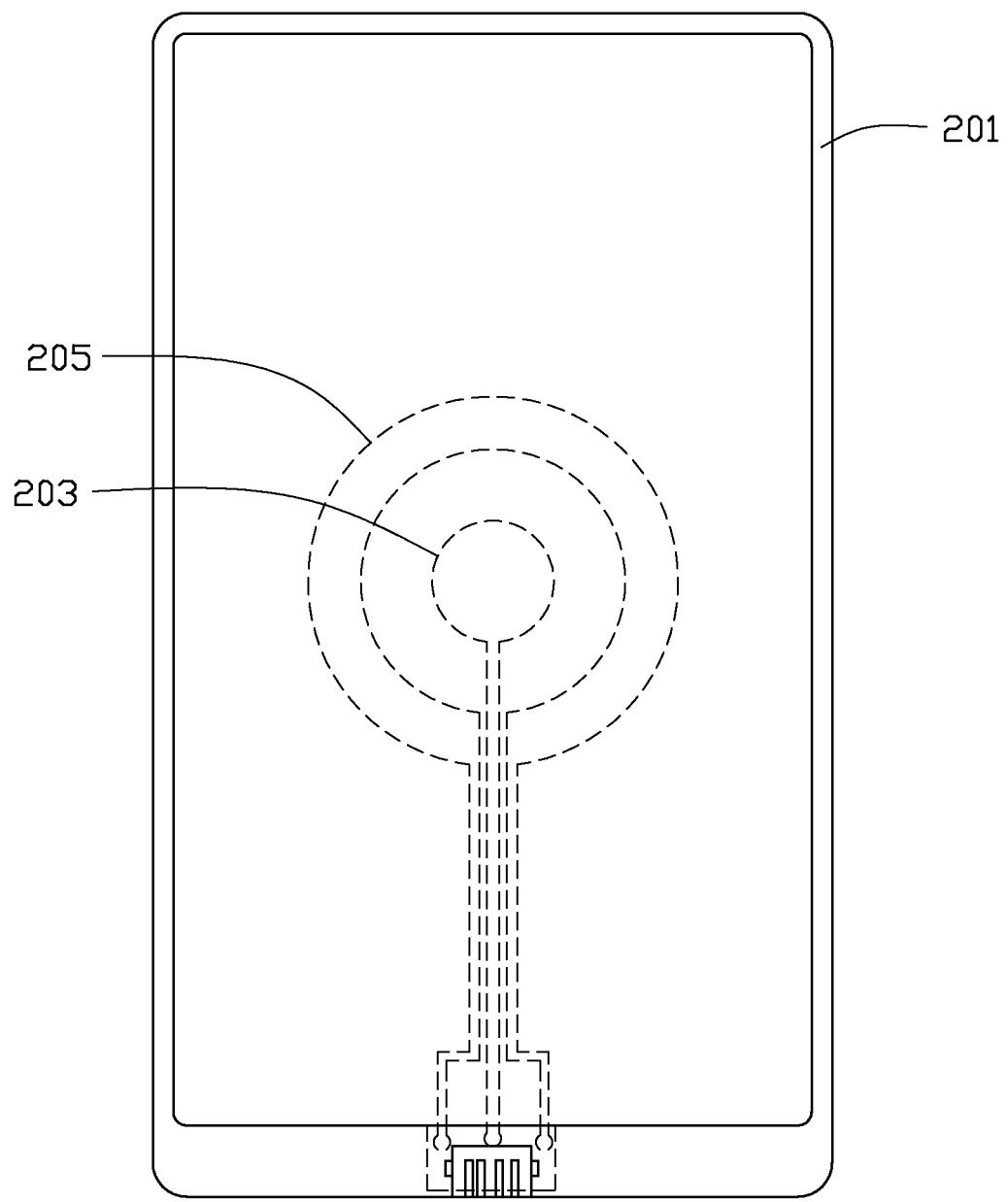
FIG. 5 is an isometric view of a housing of the portable electronic device of FIG. 3.

In addition, referring to FIG. 5, the portable electronic device 200 can include a housing 201. In this embodiment, the housing 201 is configured to coordinate with the supporting device 100 to charge the portable electronic device 200. In detail, the housing 201 includes a first conducting member 203 and a second conducting member 205. In this embodiment, the first conducting member 203 is a positive conducting point corresponding to the first conducting point 311. The second conducting member 205 is a negative conducting point corresponding to the second conducting points 313. The first conducting member 203 and the second conducting member 205 are both electrically connected to an inner charging circuit of the portable electronic device 200. Therefore, when the portable electronic device 200 with the housing 201 is supported by the supporting device 100. Due to the supporting device 100 forming two charging paths as described above. Then, if the power plate 31 of the fixing structure 30 is electronically connected to the power supply 300, the second absorbing portion 735 is electrically connected to the first conducting member 203 and the first absorbing portion 715 is electrically connected to the second conducting member 205. The power supply 300 charges the portable electronic device 200 on the supporting device 100 through the above positive charging path and the negative charging path.

In other embodiments, the first conducting point 311 of the supporting device 100 can also be a negative conducting point and the second conducting point 313 is a positive conducting point. Then, the first absorbing portion 715, the conducting sheet 553, the rotating portion 53, the main portion 331, the first conducting portion 333, and the second conducting point 373 are connected in order, thereby forming a positive charging path. The second absorbing portion 735, the elastic member 737, the conducting sheet 739, the head portion 371, the second conducting portion 373, and the first conducting point 311 are electrically connected in order, thereby forming a negative charging path.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A supporting device comprising:
a base, the base comprising a receiving portion;
a fixing structure mounted to the base, the fixing structure comprising a first conducting member, an insulating member, and a second conducting member, wherein the first conducting member is assembled to the receiving portion to conduct a first charging current, the second conducting member is configured to conduct a second charging current, the insulating member is positioned between the first conducting member and the second conducting member and is configured to isolate the first conducting member and the second conducting member;
a rotating structure rotatably mounted to the fixing structure; and
a supporting structure configured to support a portable electronic device;
wherein the supporting structure is mounted to the rotating structure and rotates along with the rotating structure relative to the fixing structure; and
wherein the rotating structure is sleeved on the second conducting member and resists the first conducting member.

2. The supporting device of claim 1, wherein the base comprises a main body, the main body is a sucker; the receiving portion is positioned at a middle portion of a top surface of the main body and one surface of the receiving portion away from the main body defines a first mounting hole, the fixing structure is mounted in the first mounting hole.

3. The supporting device of claim 1, wherein the first conducting member comprises a main portion and a first conducting portion, the first conducting portion is positioned at one end of the main portion and is secured in the first mounting hole; one surface of the main portion opposite to the first conducting portion defines a second mounting hole; the insulating member is mounted in the second mounting hole.

4. The supporting device of claim 3, wherein the insulating member comprises a first insulating portion and a second insulating portion; the second insulating portion is projected from one end of the first insulating portion and is mounted in the second mounting hole; one side of the first insulating portion away from the second insulating portion defines a third mounting hole; the second conducting member comprises a head portion and a second conducting portion, the second conducting portion is positioned at one side of the head portion facing towards the insulating member and is received in the third mounting hole; the rotating structure is mounted to the head portion and resists the first conducting portion.

5. The supporting device of claim 4, wherein the rotating structure comprises a fixing portion and a rotating portion; the rotating portion is mounted to one side of the fixing portion and is rotatably mounted to the fixing structure for resisting the main portion and rotating relative to the main portion along the head portion.

6. The supporting device of claim 5, wherein the rotating structure further comprises a mounting portion, the mounting portion is mounted at one side of the fixing portion away from the rotating portion; a receiving hole is defined at the rotating structure and passes through the mounting portion, the fixing portion, and the rotating portion; the supporting structure is mounted to the receiving hole.

7. The supporting device of claim 6, wherein the supporting structure comprises a first supporting member and a second supporting member; the first supporting member is assembled to the fixing portion; the second supporting member is received in the first supporting member and is coplanar with the first supporting member for cooperatively supporting the portable electronic device.

8. The supporting device of claim 7, wherein the first supporting member comprises a holding portion, an assembling portion, and a first absorbing portion; the assembling portion is positioned on one surface of the holding portion towards the rotating structure; the assembling portion is coupled to the fixing portion; the first absorbing portion is positioned on one surface of the holding portion away from the assembling portion; a guiding hole is defined at a middle portion of the holding portion, the second supporting member is received in the guiding hole.

9. The supporting device of claim 8, wherein the second supporting member comprises a supporting portion, a protruding portion, and a second absorbing portion; the protruding portion is positioned at one side of the supporting portion and is received in the guiding hole; the second absorbing portion is positioned on one surface of the supporting portion away from the protruding portion and is coplanar with the first absorbing portion when the second supporting member is assembled to the first supporting member.

10. The supporting device of claim 7, wherein the fixing structure further comprises a power plate, the power plate is received in the first mounting hole and comprises a first conducting point and at least one second conducting point; the insulating member is made of an insulating material; the first conducting portion resists the at least one second conducting point; the second conducting point resists the first conducting point; the first absorbing portion is electrically connected to the at least one second conducting point through the rotating portion, the main portion, and the first conducting portion; and the second absorbing portion is electrically connected to the first conducting point through the head portion and the second conducting portion.

11. The supporting device of claim 10, wherein a peripheral wall of the mounting portion defines a plurality of receiving slot, each receiving slot comprises a conducting plate, the conducting plate is electrically connected to the rotating portion and the first absorbing portion is electrically connected to the conducting plate when the first supporting member is mounted to the mounting portion; the second supporting member comprises an elastic member and a conducting sheet, a positioning hole is defined at an axis direction of the protruding portion, the elastic portion is received in the positioning hole with one end of the elastic portion fixed to the second absorbing portion and the other end of the elastic portion electrically connected to the conducting sheet; the conducting sheet resists the head portion.

12. A supporting device comprising:
a base, the base comprising a receiving portion;
a fixing structure mounted to the base, the fixing structure comprising a first conducting member, an insulating member, and a second conducting member, wherein the first conducting member is assembled to the receiving portion to conduct a first charging current, the second conducting member is configured to conduct a second charging current, the insulating member is positioned between the first conducting member and the second conducting member and is configured to isolate the first conducting member and the second conducting member;
a rotating structure rotatably mounted to the fixing structure; and
a supporting structure mounted to the rotating structure and configured to support and charge a portable electronic device;
wherein the rotating structure is sleeved on the second conducting member and resists the first conducting member.

13. The supporting device of claim 12, wherein the base comprises a main body, the main body is a sucker; the receiving portion is positioned at a middle portion of the main body and one surface of the receiving portion away from the main body defines a first mounting hole, the fixing structure is mounted in the first mounting hole.

14. The supporting device of claim 13, wherein the fixing structure comprises a power plate; the power plate is received in the first mounting hole and comprises a first conducting point and at least one second conducting point, the insulating member is made of an insulating material.

15. The supporting device of claim 12, wherein the first conducting member comprises a main portion and a first conducting portion, the first conducting portion is positioned at one end of the main portion and is secured in the first mounting hole for resisting the at least one second conducting point; one surface of the main portion opposite to the first conducting portion defines a second mounting hole; the insulating member is mounted in the second mounting hole.

16. The supporting device of claim 15, wherein the insulating member comprises a first insulating portion and a second insulating portion; the second insulating portion is projected from one end of the first insulating portion and is mounted in the second mounting hole; one side of the first insulating portion away from the second insulating portion defines a third mounting hole; the second conducting member comprises a head portion and a second conducting portion, the second conducting portion is positioned at one side of the head portion facing towards the insulating member and is received in the third mounting hole for resisting the first conducting point; the rotating structure is mounted to the head portion and resists the first conducting portion.

17. The supporting device of claim 16, wherein the rotating structure comprises a fixing portion, a rotating portion, and a mounting portion; the rotating portion is mounted to one side of the fixing portion and is rotatably mounted to the fixing structure for resisting the main portion and rotating relative to the main portion along the head portion; the mounting portion is mounted at one side of the fixing portion away from the rotating portion; a receiving hole is defined at the rotating structure and passes through the mounting portion, the fixing portion, and the rotating portion; the supporting structure is mounted in the receiving hole.

18. The supporting device of claim 17, wherein the supporting structure comprises a first supporting member and a second supporting member; the first supporting member comprises a holding portion, an assembling portion, and a first absorbing portion; the assembling portion is positioned on one surface of the holding portion towards the rotating structure; a peripheral wall of the mounting portion defines a plurality of receiving slot, each receiving slot comprises a conducting plate, the conducting plate is electrically connected to the rotating portion, the assembling portion is coupled to the fixing portion; the first absorbing portion is positioned on one surface of the holding portion away from the assembling portion and is electrically connected to the conducting plate; a guiding hole is defined at a middle portion of the holding portion, the second supporting member is received in the guiding hole and is coplanar with the first supporting member for cooperatively supporting the portable electronic device.

19. The supporting device of claim 18, wherein the second supporting member comprises a supporting portion, a protruding portion, a second absorbing portion, an elastic member, and a conducting sheet; the protruding portion is positioned at one side of the supporting portion and is received in the guiding hole; the second absorbing portion is positioned on one surface of the supporting portion away from the protruding portion and is coplanar with the first absorbing portion when the second supporting member is assembled to the first supporting member; a positioning hole is defined at an axis direction of the protruding portion, the elastic portion is received in the positioning hole with one end of the elastic portion fixed to the second absorbing portion and the other end of the elastic portion electrically connected to the conducting sheet; the conducting sheet resists the head portion.

* * * * *